United States Patent
Li et al.

(10) Patent No.: US 8,910,786 B2
(45) Date of Patent: Dec. 16, 2014

(54) PACKAGING FOR MOTORS

(71) Applicant: Hubei Queen-Ocean Electrical Appliance Manufacture Co., Ltd., Xiaogan (CN)

(72) Inventors: Wenqing Li, Xiaogan (CN); Pingfei Zhong, Xiaogan (CN); Song Jia, Xiaogan (CN)

(73) Assignee: Hubei Queen-Ocean Electrical Appliance Manufacture Co., Ltd., Xiaogan (CN)

( * ) Notice: Subject to any disclaimer, the term of this patent is extended or adjusted under 35 U.S.C. 154(b) by 81 days.

(21) Appl. No.: 13/844,965

(22) Filed: Mar. 16, 2013

(65) Prior Publication Data

US 2014/0090996 A1  Apr. 3, 2014

(30) Foreign Application Priority Data

Sep. 28, 2012 (CN) .............. 2012 2 0504311 U (51) Int. Cl.
| | |
|---|---|
| *B65D 85/68* | (2006.01) |
| *B65D 19/00* | (2006.01) |
| *B65D 19/12* | (2006.01) |
| *B65D 71/70* | (2006.01) |

(52) U.S. Cl.
CPC .. B65D 19/0093 (2013.01); *B65D 2519/00333* (2013.01); B65D 19/12 (2013.01); *B65D 2519/00024* (2013.01); *B65D 2519/00233* (2013.01); *B65D 2519/00293* (2013.01); *B65D 2519/00164* (2013.01); *B65D 2519/00059* (2013.01); *B65D 2519/0532* (2013.01); B65D 71/70 (2013.01); *B65D 2519/00656* (2013.01); *B65D 2519/00353* (2013.01); *B65D 2519/00875* (2013.01); *B65D 2519/00298* (2013.01); *B65D 2519/00323* (2013.01); *B65D 2519/00273* (2013.01); *B65D 2585/6877* (2013.01)
USPC ........................................... 206/319; 206/600

(58) Field of Classification Search
USPC .......... 206/319, 600, 335, 386; 220/1.5, 4.28, 220/4.33; 211/195
See application file for complete search history.

(56) References Cited

U.S. PATENT DOCUMENTS

| | | | | |
|---|---|---|---|---|
| 5,609,111 | A * | 3/1997 | Hasegawa et al. | 108/55.1 |
| 5,810,186 | A * | 9/1998 | Lam | 220/1.5 |
| 2004/0026283 | A1* | 2/2004 | Pigott et al. | 206/386 |
| 2011/0192760 | A1* | 8/2011 | Joubert | 206/600 |

* cited by examiner

*Primary Examiner* — David Fidei
(74) *Attorney, Agent, or Firm* — Matthias Scholl P.C.; Matthias Scholl (57) ABSTRACT

Packaging for a motor, including an iron frame and a plurality of plastic pallets. The iron frame includes a baseboard, a left guardrail, a right guardrail, a dismountable compression bar, and a support bracket. The baseboard includes a frame and a plurality of connecting rods. Each plastic pallet includes a plurality of bosses and a recess. The connecting rods are interlaced horizontally and vertically inside the frame. A plurality of the support brackets is disposed beneath the frame. The frame includes a left side and a right side. Each side is provided with two connecting holders. The left guardrail and the right guardrail are connected to and are capable of turning around two corresponding connecting holders, respectively. The left guardrail and the right guardrail are stackable after being turned over. The top of the left and the right guardrail are unfolded by connecting to the compression bar.

14 Claims, 9 Drawing Sheets

PACKAGING FOR MOTORS

CROSS-REFERENCE TO RELATED APPLICATIONS

Pursuant to 35 U.S.C. §119 and the Paris Convention Treaty, this application claims the benefit of Chinese Patent Application No. 201220504311.8 filed Sep. 28, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a packaging structure for a motor comprising an iron frame and plastic pallets.

2. Description of the Related Art

A typical mode of motor packaging shipped to the foreign countries adopts a transport mode of the combination of paper packaging and wood pallets which has the following defects:
- first, as the paper packaging and the wood pallets are easy to become damp, the packaging is damage-prone;
- second, the packaging can't be recycled, which causes great waste; and
- third, the packaging procedures are complex and tedious; and after unpackaging, the paper package is disadvantageous for the on-site management.

SUMMARY OF THE INVENTION

In view of the above-described problems, it is one objective of the invention to provide a packaging structure for a motor that has moisture resistance, higher strength, damage resistance, reliable and durable quality, easy and convenient packaging procedures, and convenience in managing, recycling overseas and reducing product packaging cost.

To achieve the above objective, in accordance with one embodiment of the invention, there is provided a packaging structure for a motor, comprising: an iron frame, the iron frame comprising: a baseboard comprising a frame and a plurality of connecting rods, a left guardrail, a right guardrail, a dismountable compression bar, and a support bracket; and a plurality of plastic pallets, each plastic pallet comprising: a plurality of bosses, and a recesses. The recess is enclosed by a plurality of the bosses. A plurality of plastic pallets is stacked and disposed on the baseboard. The connecting rods are horizontally and vertically interlaced inside the frame. A plurality of the support brackets is disposed beneath the frame. An Entry is formed in a middle part of the support bracket. The frame comprises a left side and a right side, and each side is provided with two connecting holders. The left guardrail is connected with two connecting holders on the left side of the frame and is capable of turning around corresponding connecting holders. The right guardrail is connected with two connecting holders on the right side of the frame and is capable of turning around corresponding connecting holders. The left guardrail and the right guardrail are stackable after being turned over, and a top of the left guardrail and a top of the right guardrail are unfolded by connecting to the dismountable compression bar.

In a class of this embodiment, the connecting holder is hollow and is provided with an opening on one side to allow the left guardrail and the right guardrail to turn over. The connecting holder is provided with a stripped hole. A dowel passes through the stripped hole and the left or right guardrail, to allow the left or the right guardrail, and the corresponding connecting holder to form a rotatable connection.

In a class of this embodiment, a plurality of positioning blocks is arranged on a top of four sides of the frame for limiting the plastic pallet on a bottom.

In a class of this embodiment, the top of the frame is convex to form a plurality of packaging supports matching with packaging tapes.

In a class of this embodiment, the plastic pallet is made of a high-density polyethylene (HDPE) material; and the iron frame is made of stainless steel.

In a class of this embodiment, two supporting bosses are disposed on a bottom surface of the recess.

In a class of this embodiment, the two supporting bosses form an arc-shaped recess.

In a class of this embodiment, two connecting holders on the right of the frame are connected by a right connecting rod. Two connecting holders on the left side of the frame are connected by a left connecting rod.

In a class of this embodiment, the right connecting rod and the left connecting rod are provided with a plurality of hooks.

Advantages of the invention are summarized as follows:
1) The plastic pallets are made of high-density polyethylene (HDPE) materials. The iron frame is made of stainless steel. The combination of the iron frame and plastic pallets is very convenient for the packing, unpacking, and delivery of motors. Items packed and their quantity is clear. The invention is very convenient for storage management, improves the on-site 5S management of workshops and reduces the packaging cost greatly. Hence, the invention has advantages of moisture resistance, higher strength, damage resistance, reliable and durable quality, easy and convenient packaging procedures and convenience in managing, recycling overseas, and reducing product packaging cost.
2) The left and right guardrails of the iron frame can be folded and unfolded, which reduces space occupation and is convenient for recycling.
3) The four sides of the top of the frame are provided with a plurality of positioning blocks for limiting the plastic pallets at the bottom, thereby simplifying the installation.
4) The top of the frame is provided with a plurality of packaging supports matching with packaging tapes. The iron frame is provided with the right guardrail and the left guardrail on two sides to strengthen the packaging stability. A movable compression bar is arranged on the top of the right and left guardrails also to strengthen the packaging stability.
5) The plastic pallet is made of HDPE materials. The plastic pallet is even in thickness and has advantages of high weather-resistant stress cracking capability, easy method of operating, wide application, long service life, environmental protection and easy method of cleaning. The plastic pallet matches with the iron frame for transport. The size of the plastic pallet matches with that of the inner cavity of the iron frame. The plastic pallet is connected with the iron frame as a whole body by packaging tapes, which makes the structure more stable and avoids tilts caused by vibration during transport.
6) The plastic pallet is provided with a plurality of recesses and bosses matching with the appearance of the motor. These recesses and bosses are arranged in a certain pattern. By these recesses and bosses, the motors are erected and disposed on the plastic pallet orderly. By the support of the motor covers and plastic pallets, the motors are piled up.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a packaging structure for a motor are described below. It should be noted that the following examples are intended to describe and not to limit the invention.

As shown in FIGS. 1-9, a packaging structure for a motor comprises: an iron frame 1, and a plurality of plastic pallets 2. Each plastic pallet 2 is provided with a plurality of bosses 21. A recess 22 is enclosed by a plurality of bosses 21 for motor installation. A plurality of plastic pallets 2 is stacked and disposed on a baseboard 11 of the iron frame. The iron frame 1 comprises: a baseboard 11, a left guardrail 12, a right guardrail 13, a dismountable compression bar 14, and a support bracket 15. The baseboard 11 comprises: a frame 110, and a plurality of connecting rods 111 that are horizontally and vertically interlaced. A plurality of the support brackets 15 is arranged beneath the frame 110. Entries 151 are formed in a middle part of the support brackets 15. The frame 110 comprises a left side and a right side, and each side is provided with two connecting holders 16. The left guardrail 12 is connected with two connecting holders 16 on the left side of the frame 110 and is capable of turning around corresponding connecting holders 16. The right guardrail 13 is connected with two connecting holders 16 on the right side of the frame 110 and is capable of turning around corresponding connecting holders 16. The left guardrail 12 and the right guardrail 13 are stackable after being turned over, and a top of the left guardrail 12 and a top of the right guardrail 13 are expended by connecting to the dismountable compression bar 14.

Figure 4:
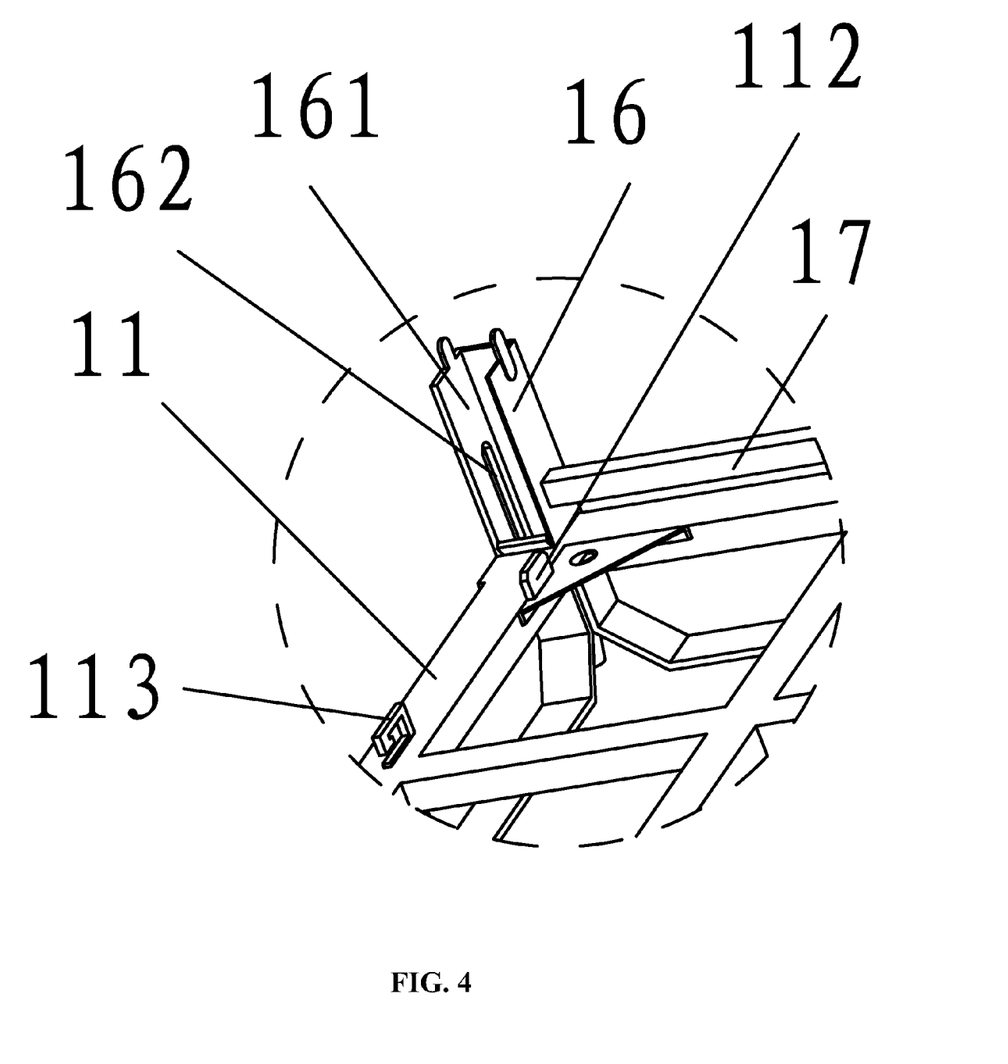
FIG. 4 is an enlarged view of part A-A of FIG. 3.
Figure 5:
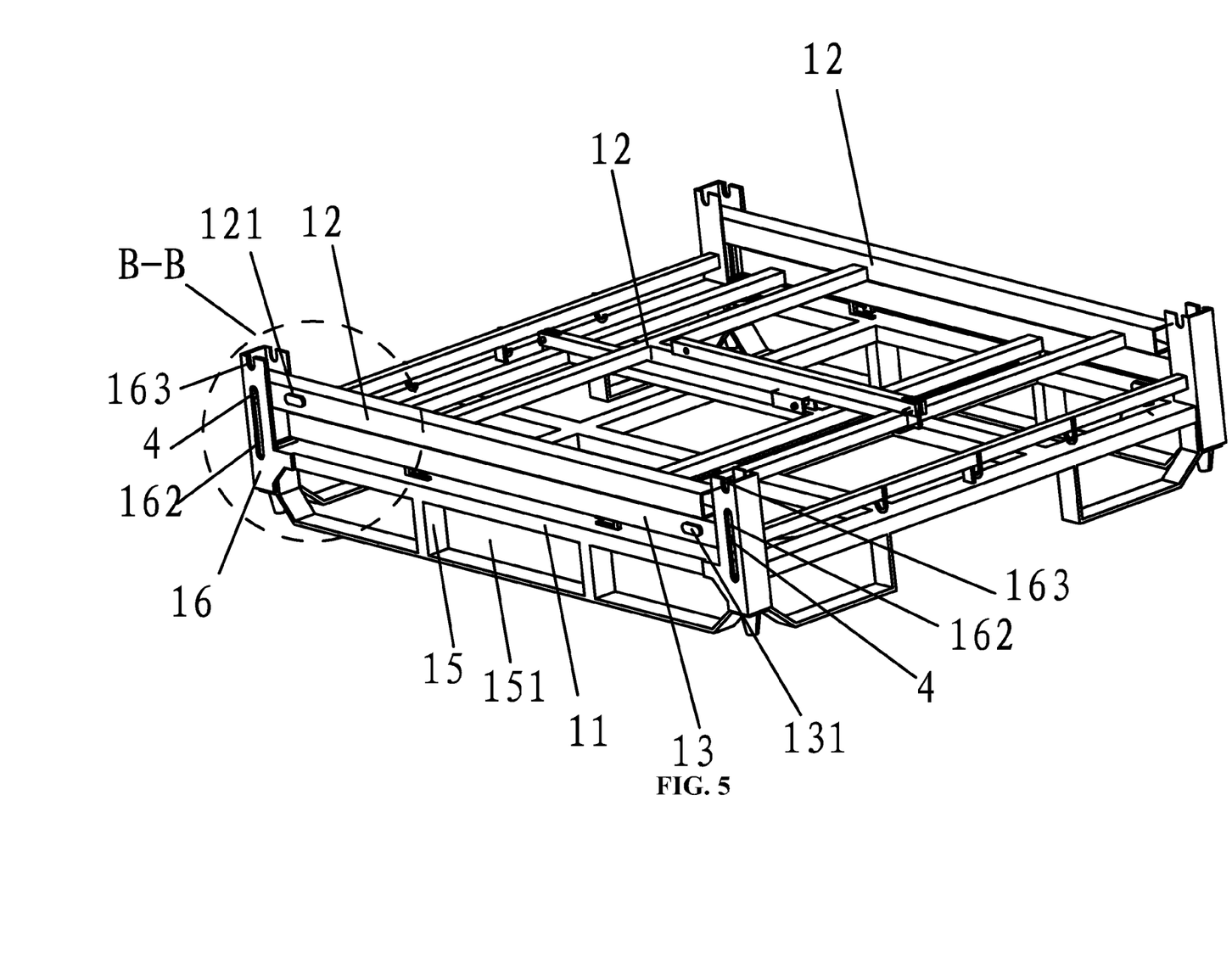
FIG. 5 is a stereogram of an iron frame in a folded state in accordance with one embodiment of the invention.
Figure 6:
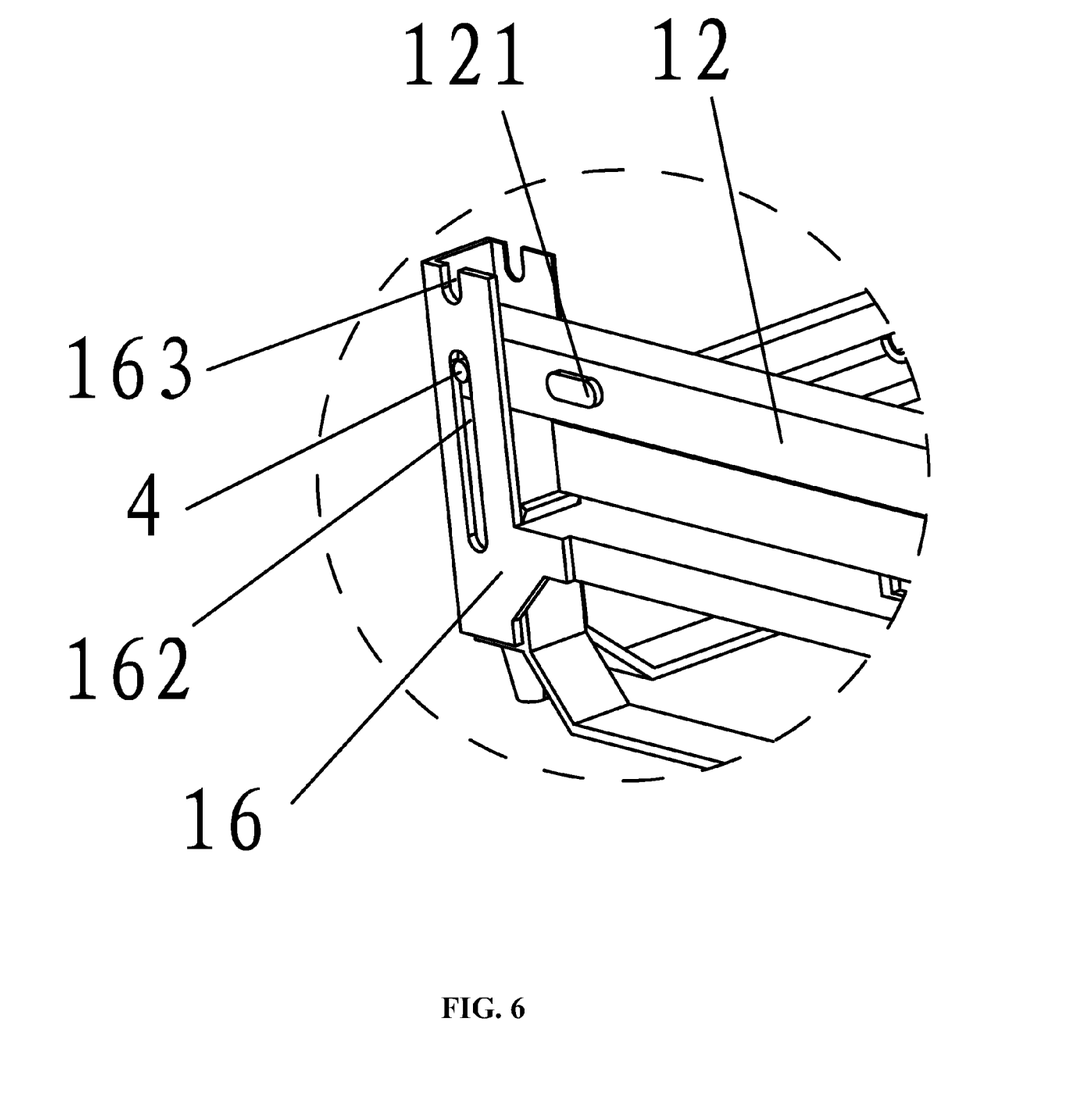
FIG. 6 is an enlarged view of part B-B of FIG. 5.
Figure 7:
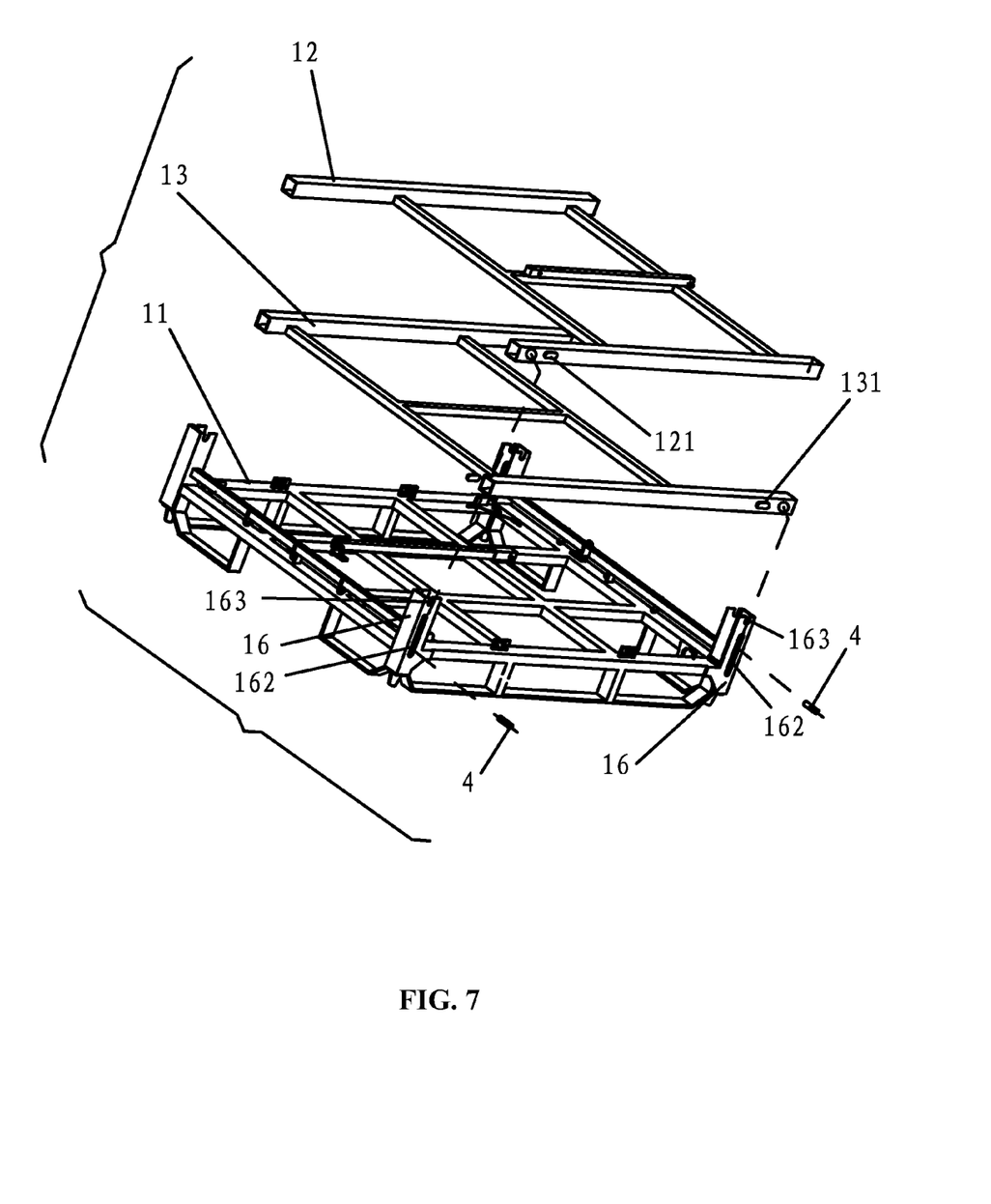
FIG. 7 is an exploded view of an iron frame in accordance with one embodiment of the invention.

The connecting holder 16 is hollow and is provided with an opening 161 on one side to allow the left guardrail 12 and the right guardrail 13 to turn over. The connecting holder 16 is provided with a stripped hole 162. A dowel 4 passes through the stripped hole 162 and the left or right guardrail 12, 13 to allow the left or right guardrail 12, 13 and the corresponding connecting holder 16 to form a rotatable connection. A neck 163 is arranged on a top of the connecting holder 16. The left guardrail 12 and the right guardrail 13 are provided with fixture blocks 121 and 131. When the left guardrail 12 and the right guardrail 13 are erected and unfolded, the fixture blocks 121, 131 are inserted in corresponding necks 163. The dowel 4 in upward and downward movable in the stripped hole 162, which allows the left guardrail 12 and the right guardrail 13 to be folded and unfolded.

Figure 3:
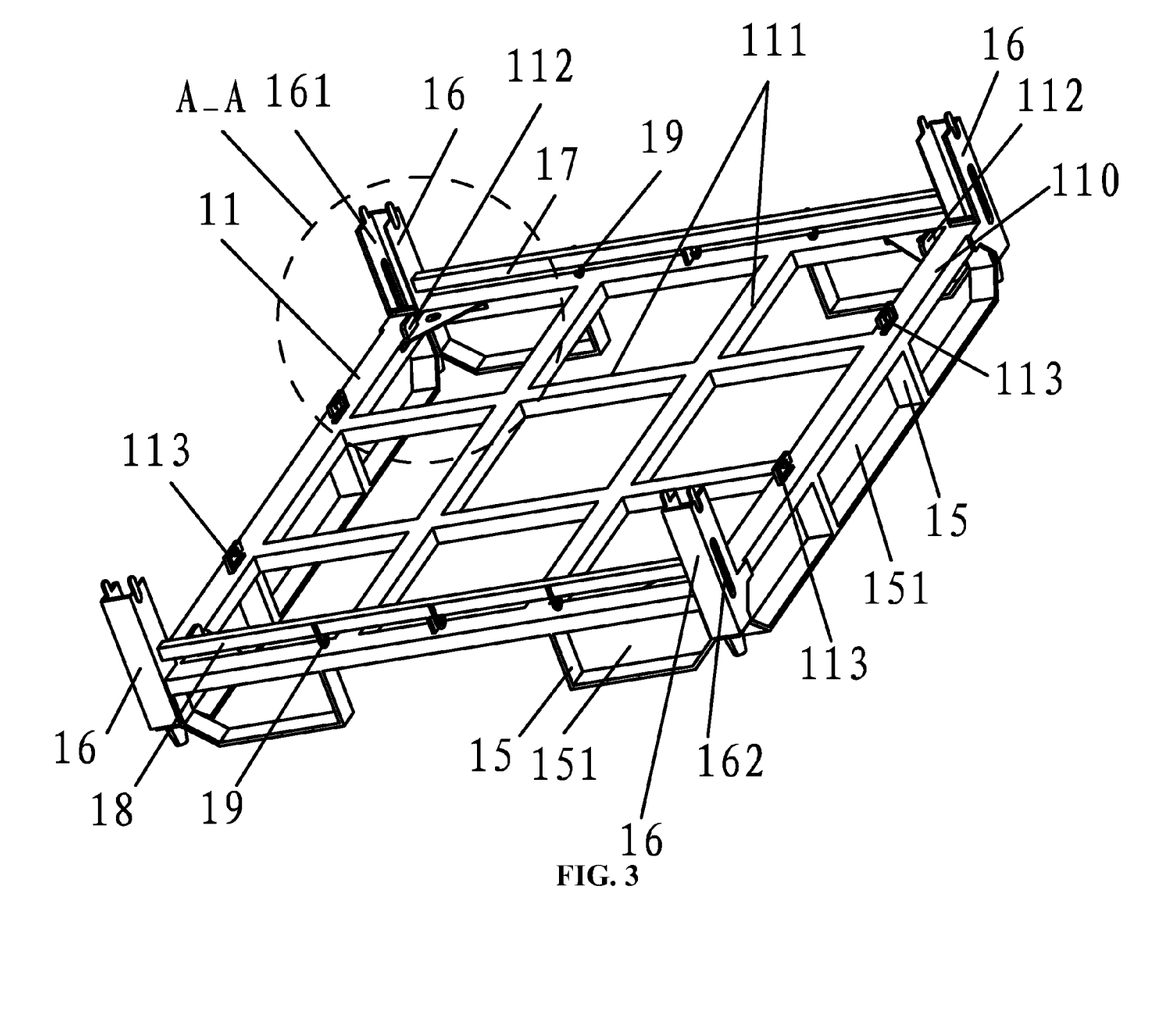
FIG. 3 is a stereogram of a baseboard of an iron frame in accordance with one embodiment of the invention.

A plurality of positioning blocks 112 is arranged on a top of four sides of the frame 110 for limiting the plastic pallet 2 on a bottom.

The top of the frame 110 is convex to form a plurality of packaging supports 113 matching with packaging tapes.

The plastic pallet 2 is made of a high-density polyethylene (HDPE) material; and the iron frame 1 is made of stainless steel.

Figure 8:
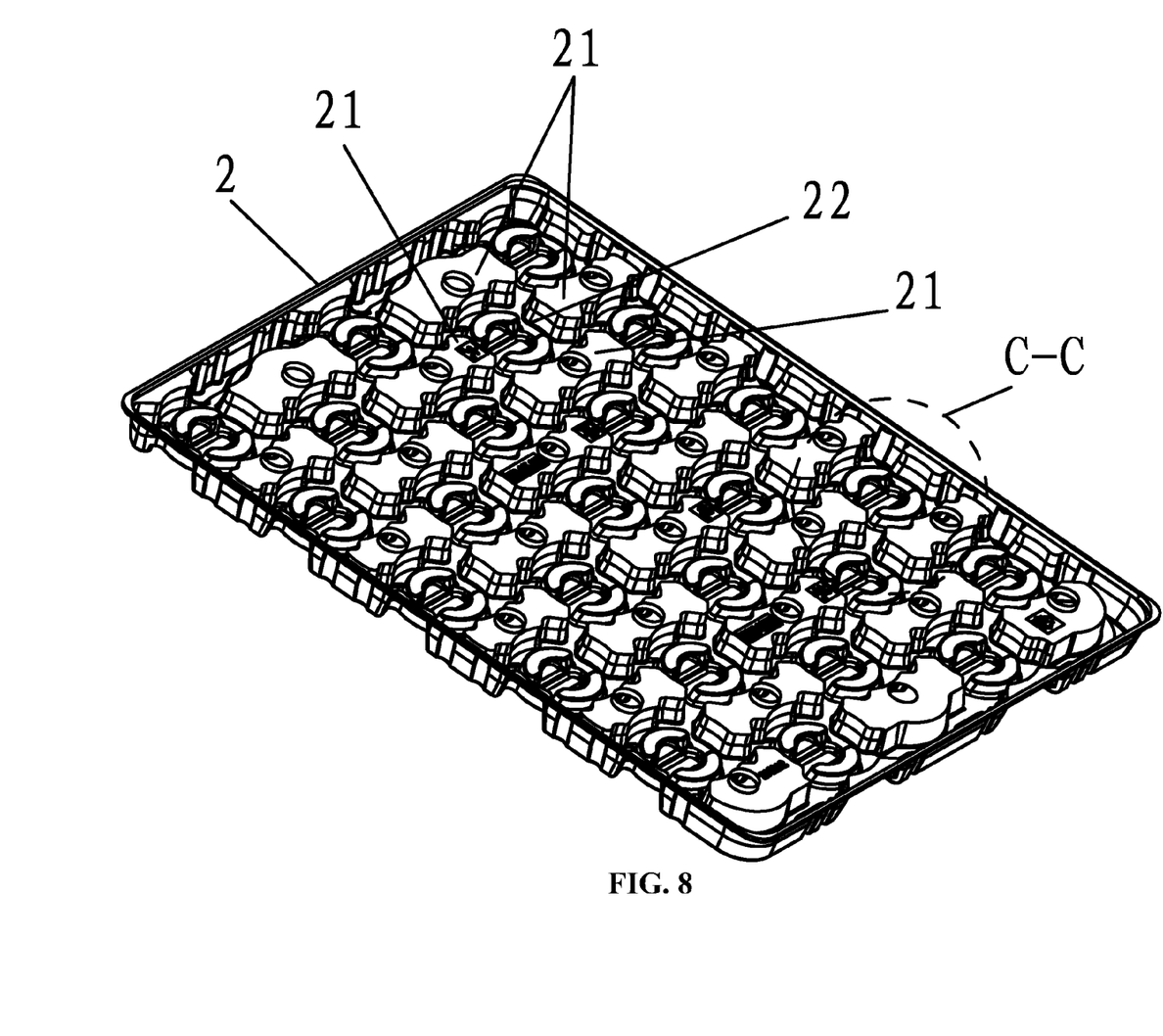
FIG. 8 is an stereogram of a plastic pallet in accordance with one embodiment of the invention.
Figure 9:
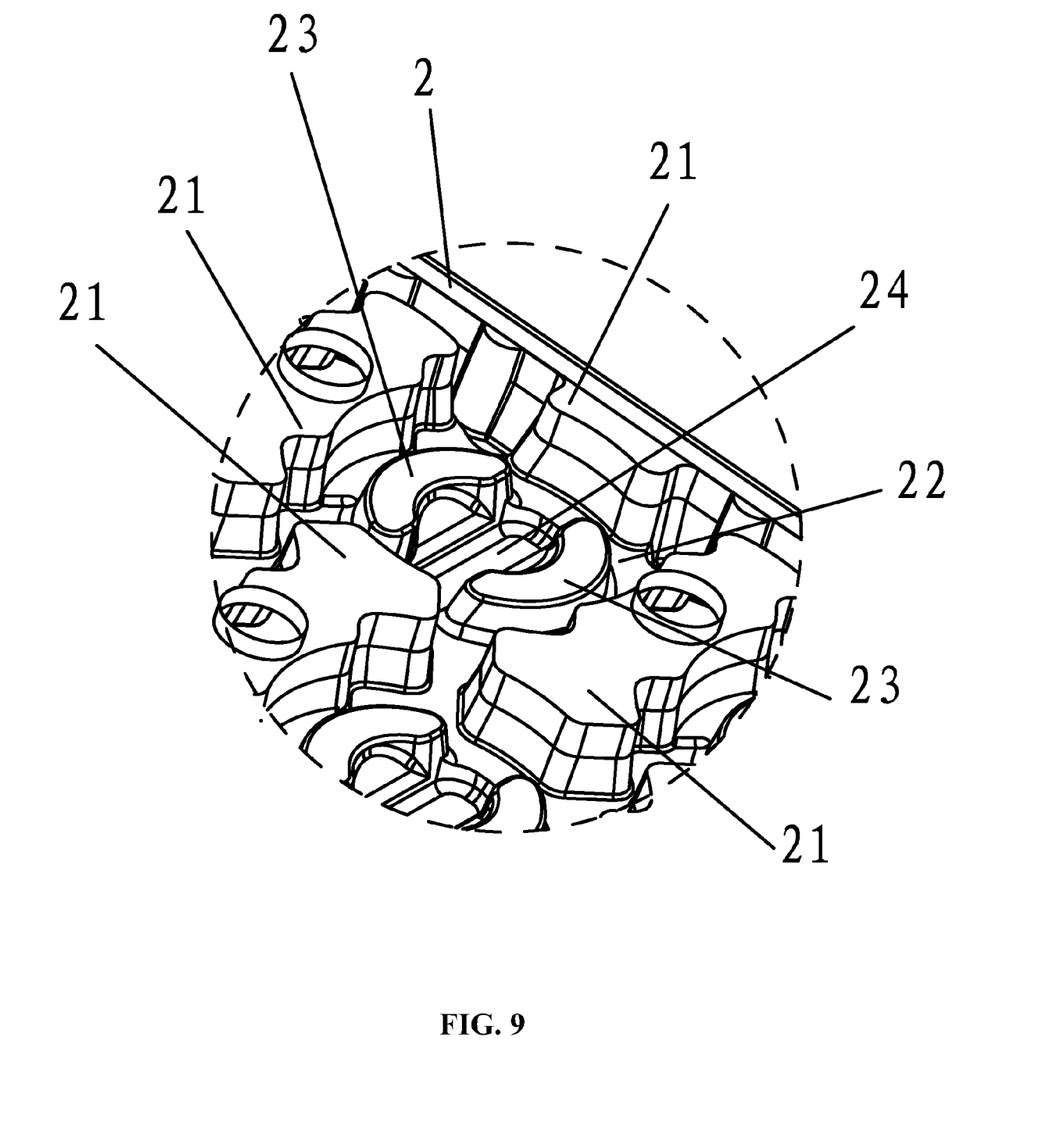
FIG. 9 is an enlarged view of part C-C of FIG. 8.

Two supporting bosses 23 are disposed on a bottom surface of the recess 22.

The two supporting bosses 23 form an arc-shaped recess 24.

Two connecting holders 16 on the right of the frame 110 are connected by a right connecting rod 17. Two connecting holders 16 on the left side of the frame 110 are connected by a left connecting rod 18.

The right connecting rod 17 and the left connecting rod 18 are provided with a plurality of hooks 19.

Figure 1:
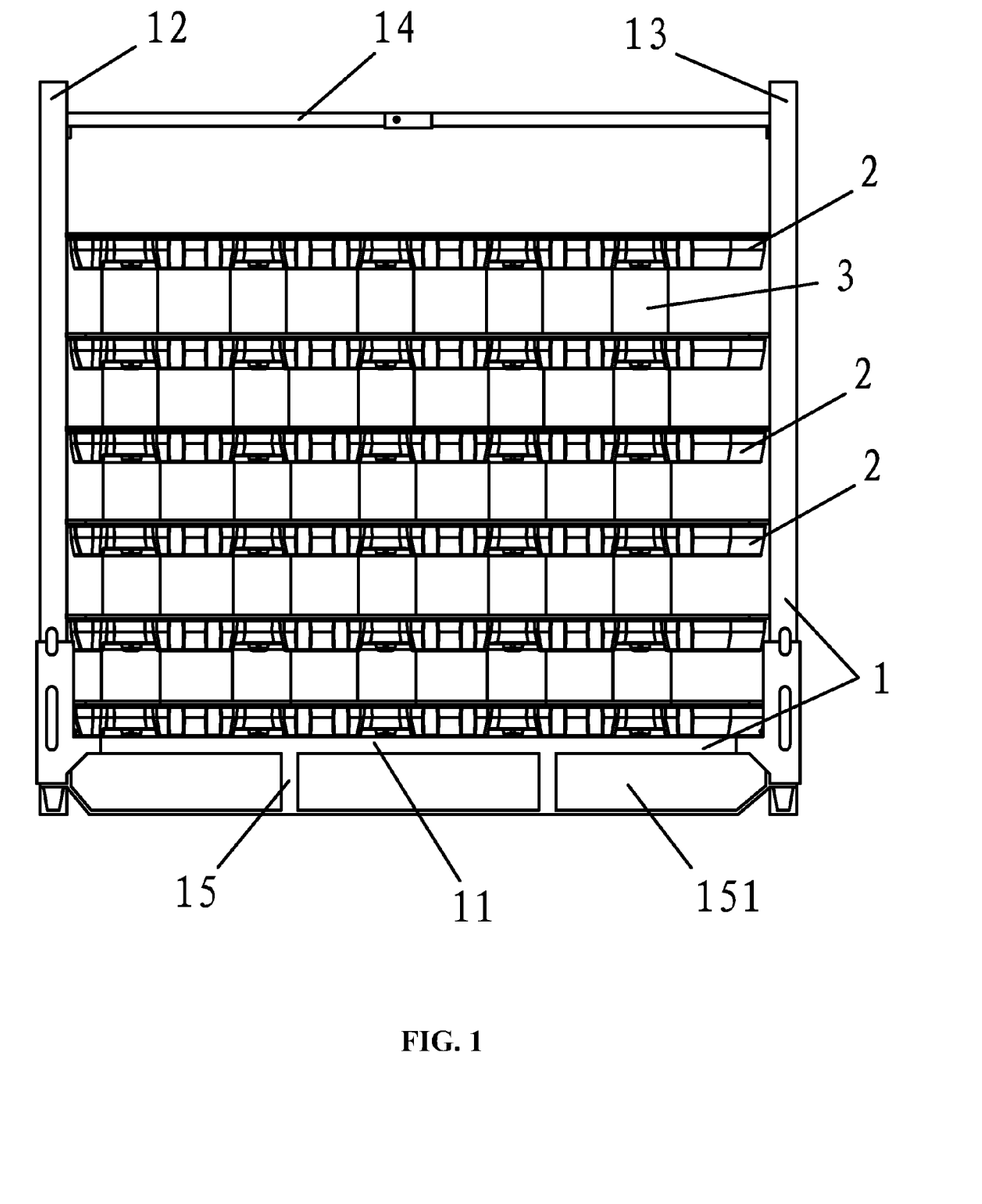
FIG. 1 is a structure diagram of a packaging structure for a motor in use in accordance with one embodiment of the invention.
Figure 2:
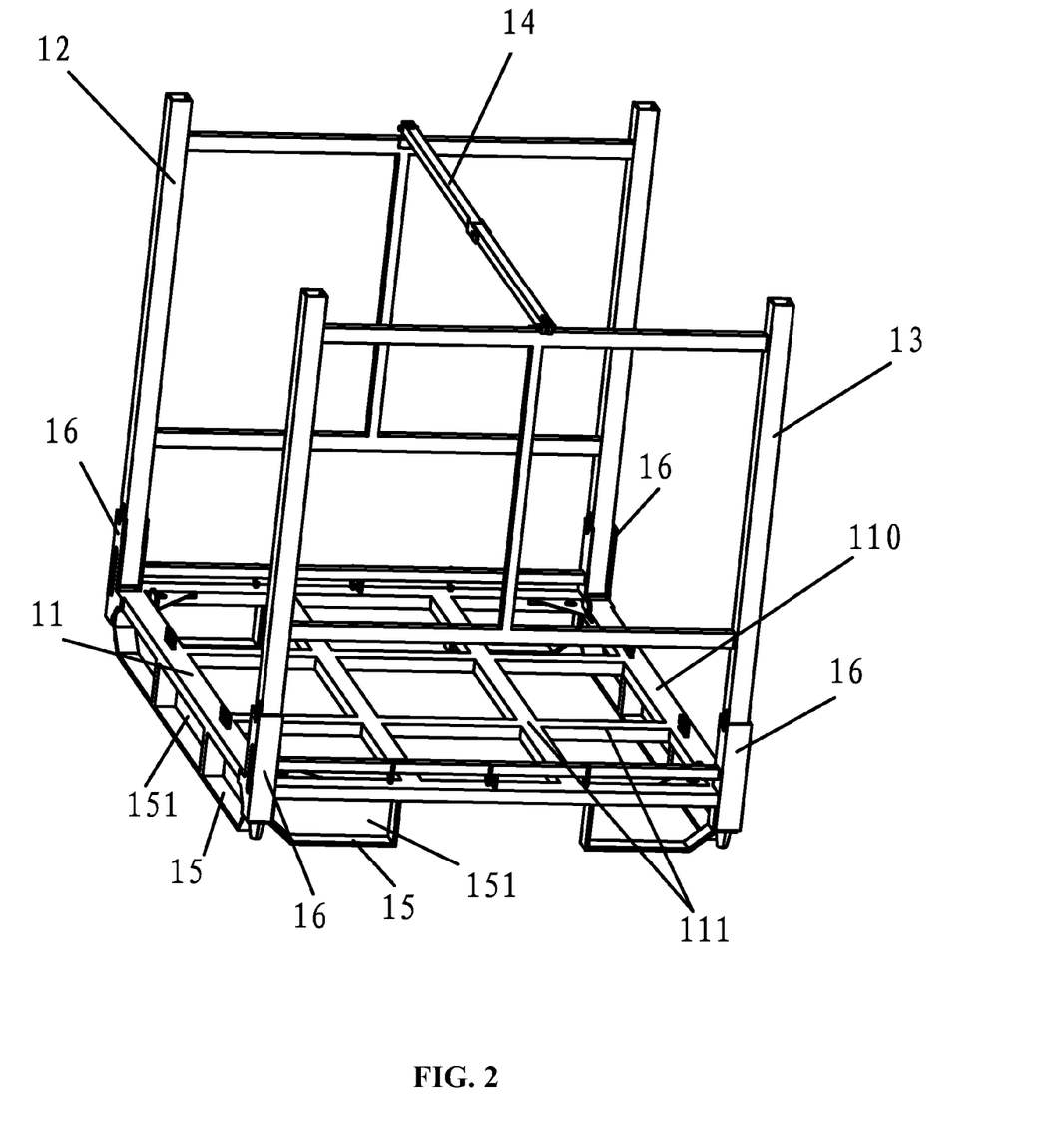
FIG. 2 is a stereogram of an iron frame in an unfolded state in accordance with one embodiment of the invention.

Working principle of the invention is as follows: to load motors 3, place the motors one after another on the plastic pallet 2; stack a plurality of the plastic pallets loaded with motors 3 on the iron frame 1. Motors are disposed between adjacent upper and lower plastic pallets. After the loading, a whole package is conducted by using packaging tapes, and then the packed motors are delivered. After receiving the cargo, clients unpacked the packaging. The combination of the iron frame and the plastic pallets makes the operation of packing, unpacking and delivering become very simple and convenient. The items packed and their quantity is clear. The invention is very convenient for storage management, improves the on-site 5S management of workshops and reduces the packaging cost greatly. The iron frame 1 can be folded and a plurality of plastic pallets can be stacked up to reduce space occupation. As the invention can be recycled, the packaging cost of products is reduced; furthermore, the invention is more environmental-friendly and durable.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A packaging structure for a motor, comprising:
    a) an iron frame (1), the iron frame comprising: a baseboard (11) comprising a frame (110) and a plurality of connecting rods (111), a left guardrail (12), a right guardrail (13), a dismountable compression bar (14), and a support bracket (15); and
    b) a plurality of plastic pallets (2), each plastic pallet (2) comprising: a plurality of bosses (21) and a recess (22);
    wherein
    the recess (22) is enclosed by a plurality of the bosses (21);
    a plurality of plastic pallets (2) is stacked and disposed on the baseboard (11);
    the connecting rods (111) are horizontally and vertically interlaced inside the frame (110);
    a plurality of support brackets (15) is disposed beneath the frame (110);
    an entry (151) is formed in a middle part of the support bracket (15);

the frame (110) comprises a left side and a right side, and each side is provided with two connecting holders (16);

the left guardrail (12) is connected with two connecting holders (16) on the left side of the frame (110) and is capable of turning around corresponding connecting holders (16);

the right guardrail (13) is connected with two connecting holders (16) on the right side of the frame (110) and is capable of turning around corresponding connecting holders (16);

the left guardrail (12) and the right guardrail (13) are stackable after being turned over; and a top of the left guardrail (12) and a top of the right guardrail (13) are unfolded by connecting to the dismountable compression bar (14).

2. The packaging structure of claim 1, wherein the connecting holder (16) is hollow and is provided with an opening (161) on one side to allow the left guardrail (12) and the right guardrail (13) to turn over;

the connecting holder (16) is provided with a stripped hole (162);

a dowel (4) passes through the stripped hole (162) and the left or right guardrail (12, 13) to allow the left or right guardrail (12, 13) and the corresponding connecting holder (16) to form a rotatable connection.

3. The packaging structure of claim 1, wherein a plurality of positioning blocks (112) is arranged on a top of four sides of the frame (110) for limiting the plastic pallet (2) on a bottom.

4. The packaging structure of claim 2, wherein a plurality of positioning blocks (112) is arranged on a top of four sides of the frame (110) for limiting the plastic pallet (2) on a bottom.

5. The packaging structure of claim 3, wherein the top of the frame (110) is convex to form a plurality of packaging supports (113) matching with packaging tapes.

6. The packaging structure of claim 4, wherein the top of the frame (110) is convex to form a plurality of packaging supports (113) matching with packaging tapes.

7. The packaging structure of claim 5, wherein the plastic pallet (2) is made of a high-density polyethylene (HDPE) material; and the iron frame (1) is made of stainless steel.

8. The packaging structure of claim 6, wherein the plastic pallet (2) is made of a high-density polyethylene (HDPE) material; and the iron frame (1) is made of stainless steel.

9. The packaging structure of claim 5, wherein two supporting bosses (23) are disposed on a bottom surface of the recess (22).

10. The packaging structure of claim 6, wherein two supporting bosses (23) are disposed on a bottom surface of the recess (22).

11. The packaging structure of claim 5, wherein the two supporting bosses (23) form an arc-shaped recess (24).

12. The packaging structure of claim 6, wherein the two supporting bosses (23) form an arc-shaped recess (24).

13. The packaging structure of claim 1, wherein two connecting holders (16) on the right of the frame (110) are connected by a right connecting rod (17); and two connecting holders (16) on the left side of the frame (110) are connected by a left connecting rod (18).

14. The packaging structure of claim 1, wherein the right connecting rod (17) and the left connecting rod (18) are provided with a plurality of hooks (19).

\* \* \* \* \*